United States Patent
Yu (12)

(10) Patent No.: US 6,760,835 B1
(45) Date of Patent: Jul. 6, 2004

(54) INSTRUCTION BRANCH MISPREDICT STREAMING

(75) Inventor: Elaine Y. Yu, Santa Clara, CA (US)

(73) Assignee: LSI Logic Corporation, Milpitas, CA (US)

( * ) Notice: Subject to any disclaimer, the term of this patent is extended or adjusted under 35 U.S.C. 154(b) by 576 days.

(21) Appl. No.: 09/721,079

(22) Filed: Nov. 22, 2000

(51) Int. Cl.[7] .............................................. G06F 9/42
(52) U.S. Cl. ...................................... 712/205; 712/234
(58) Field of Search ............................. 712/235, 237, 712/239, 206, 207, 205, 234

(56) References Cited

U.S. PATENT DOCUMENTS

| | | | |
|---|---|---|---|
| 5,634,103 A | * | 5/1997 | Dietz et al. .................. 712/235 |
| 6,076,146 A | * | 6/2000 | Tran et al. ................... 711/125 |
| 6,092,186 A | * | 7/2000 | Betker et al. ................ 712/233 |
| 6,438,656 B1 | * | 8/2002 | Arimilli et al. ............. 711/137 |

* cited by examiner

*Primary Examiner*—Eddie Chan
*Assistant Examiner*—Barry J. O'Brien
(74) *Attorney, Agent, or Firm*—Christopher P. Maiorana PC

(57) ABSTRACT

A method and an architecture for recovery from a branch misprediction in a processor. The method may include the steps of (A) evaluating a branch prediction for a branch instruction, (B) pausing an instruction cache line fetch in response to the branch instruction, and (C) resuming the instruction cache line fetch from where paused in response to evaluating the branch prediction as incorrect to recover from the branch misprediction.

20 Claims, 4 Drawing Sheets

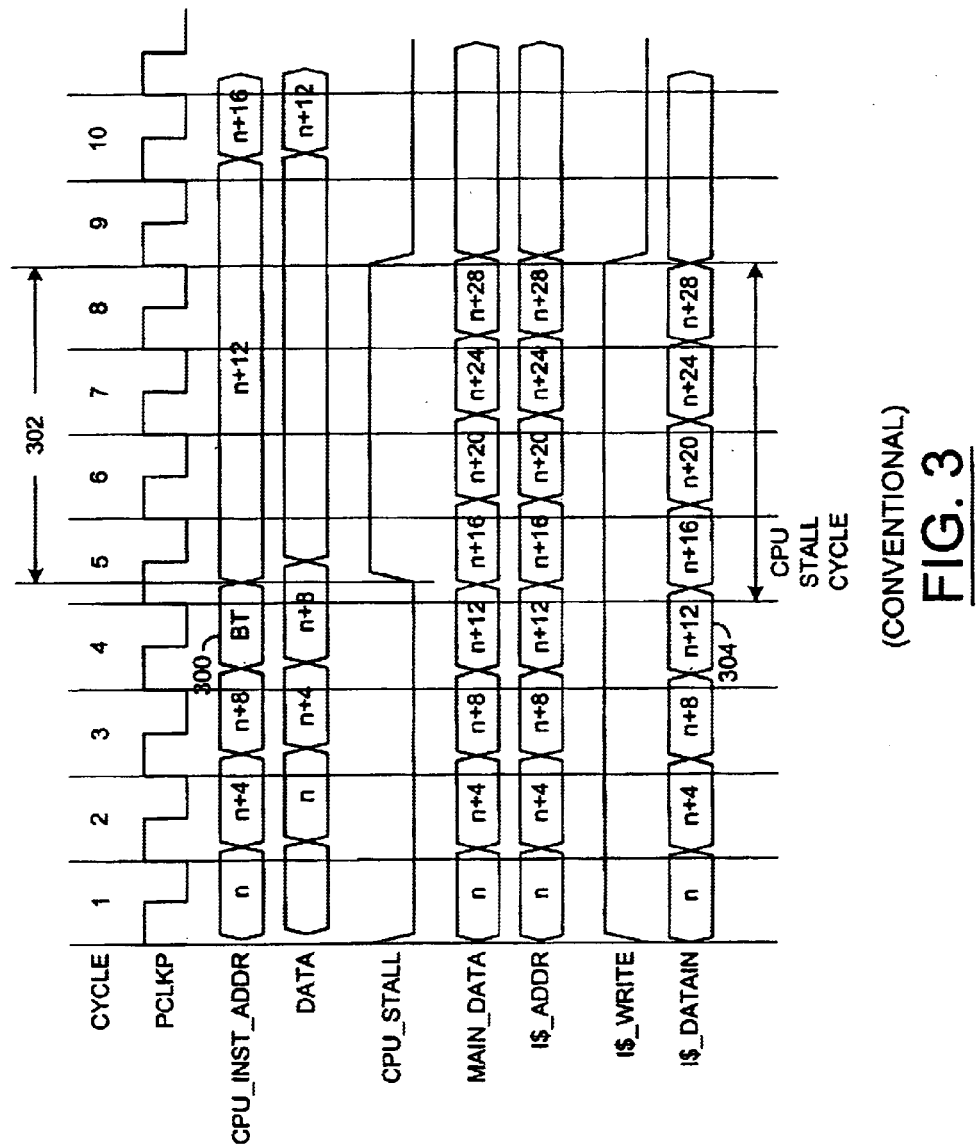
FIG. 3 (CONVENTIONAL)

INSTRUCTION BRANCH MISPREDICT STREAMING

FIELD OF THE INVENTION

The present invention relates to processor branch prediction generally and, more particularly, to a method and/or architecture for implementing branch misprediction recovery for an instruction cache memory.

BACKGROUND OF THE INVENTION

Modern pipelined processors generally incorporate some form of branch prediction to maximize performance when encountering a branch instruction in a stream of instructions. A correct branch prediction of taking a branch will result in a modest delay to a pipeline of the processor while the target branch instruction is fetched from a main memory. A branch misprediction of taking the branch can result in unnecessary delays in the pipeline. In particular, if the branch misprediction occurs early in an instruction cache line fetch operation, the pipeline is stalled while the instruction cache line fetch operation is completed. Once the instruction cache line fetch operation is completed, the pipeline stall is removed and a request for the next instruction in the branch is made to the main memory. Consequently, evaluation of the branch prediction is not performed until after the instruction cache line fetch operation has completed and the pipeline stall has been removed.

Stalling the pipeline during instruction cache line fetching introduces unnecessary delays in the event of a branch misprediction. Since the branch should not have been taken, there is no reason to wait for the current instruction cache line fetch operation to complete. It would be desirable to execute the next sequential instruction immediately if the next sequential instruction has already been copied into an instruction cache memory of the processor. Overall processor performance would be improved if the unnecessary stalls following a mispredicted branch taken were reduced or eliminated.

SUMMARY OF THE INVENTION

The present invention concerns a method and/or an architecture for recovering from a branch misprediction in a processor. The method may comprise the steps of (A) evaluating a branch prediction for a branch instruction, (B) pausing an instruction cache line fetch in response to the branch instruction, and (C) resuming the instruction cache line fetch in response to a branch misprediction.

The objects, features and advantages of the present invention include (i) providing a method and/or architecture for a processor to recover from a branch misprediction of taking the branch, and/or (ii) improving a performance of the processor by eliminating or reducing a number of stall cycles following the branch misprediction.

BRIEF DESCRIPTION OF THE DRAWINGS

These and other objects, features and advantages of the present invention will be apparent from the following detailed description and the appended claims and drawings in which:

FIG. 3 is a timing diagram of an instruction stream containing a branch instruction requiring a pipeline stall.

DETAILED DESCRIPTION OF THE PREFERRED EMBODIMENTS

Figure 1:
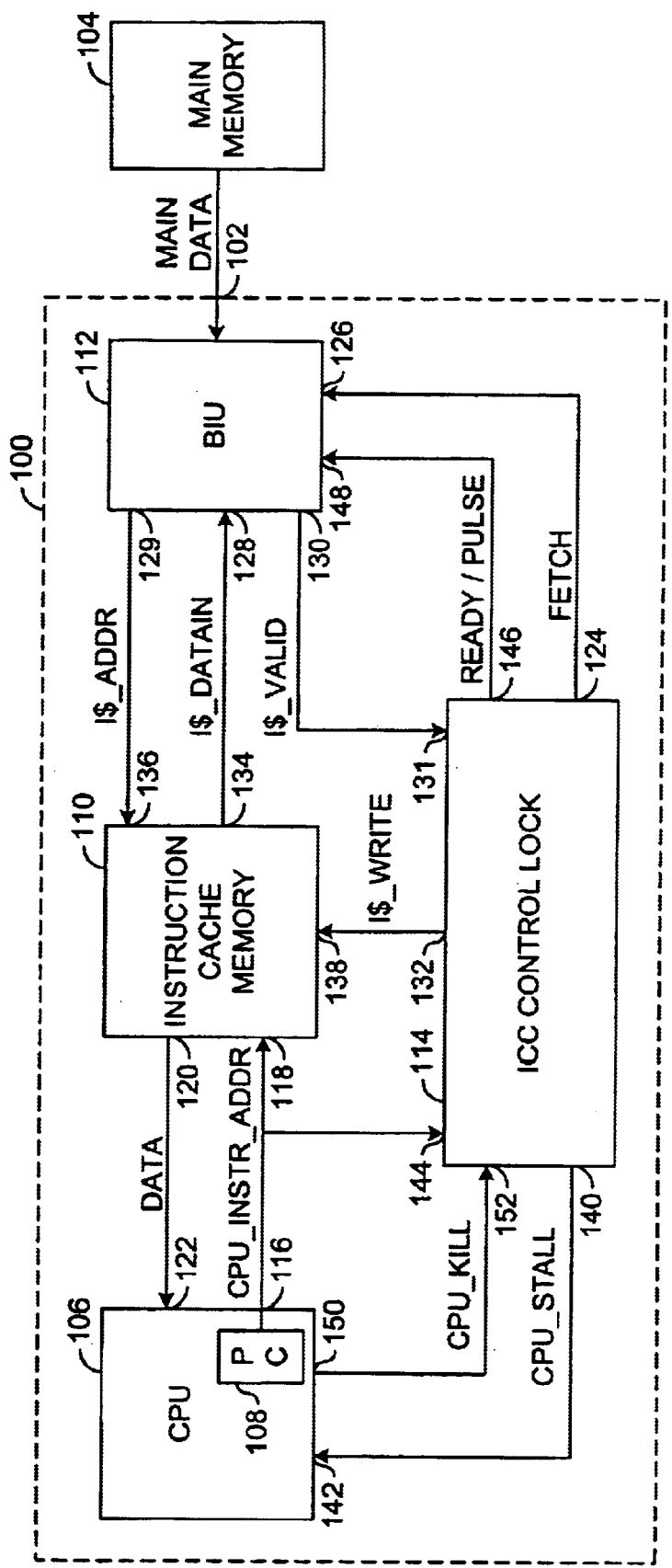
FIG. 1 is a block diagram of a circuit 100 illustrating a preferred embodiment of the present invention.

Referring to FIG. 1, a block diagram of a circuit 100 illustrating a preferred embodiment of the present invention is shown. The circuit 100 may have an input 102 that may receive a signal (e.g., MAIN_DATA) from a main memory 104. The signal MAIN_DATA generally provides instructions from the main memory 104 to the circuit 100 for execution by the circuit 100. The term "instructions" may refer to both an instruction address item and/or an instruction data item. In one example, the instructions may comprise one or more branch instructions.

The circuit 100 may be implemented as a pipelined processor. The circuit 100 may be configured to execute the instructions in a sequence that the instructions are received from the main memory 104. The circuit 100 may also be configured make a branch prediction whenever encountering a branching instruction within the sequence of instructions. If the branching instruction is encountered while fetching instructions from the main memory 104, then the circuit 100 will pause the fetching operation while the branching instruction is evaluated. The circuit 100 generally comprises, but is not limited to, a central processing unit (CPU) 106 having a program counter (PC) 108, an instruction cache memory 110, a bus interface unit (BIU) 112, and an instruction-cache controller (ICC) control logic 114.

The CPU 106 may have an output 116 that may present a signal (e.g., CPU_INSTR_ADDR). The signal CPU_INSTR_ADDR may be an instruction address signal. The signal CPU_INSTR_ADDR generally comprises a sequence of instruction address items generated by the program counter 108. These instruction address items may indicate instruction data items to be fetched from the instruction cache memory 110. The signal CPU_INSTR_ADDR may be presented to an input 118 of the instruction cache memory 110.

The instruction data items are generally arranged inside the instruction cache memory 110 as a number of bytes of information. In one example, the program counter 108 may increment the signal CPU_INSTR_ADDR by units of two to request the next instruction data item in a sequence of two-byte (16-bits) words. In cases where the instruction data items are four-byte (32-bit) words, the program counter 108 will generally increment the signal CPU_INSTR_ADDR in units of four. In another example, the program counter 108 will generally increment the signal CPU_INSTR_ADDR in units of eight when each instruction data item comprises an eight-byte (64-bit) word. The program counter 108 may be configured to use other incremental units to meet the design criteria of a particular application.

The instruction cache memory 110 may respond to each instruction address item in the signal CPU_INSTR_ADDR by presenting an appropriate instruction data item. The instruction cache memory 110 may present these instruction data items in an instruction signal (e.g., DATA) at an output 120. The CPU 106 may receive the signal DATA at an input 122. Instruction data items received in the signal DATA are generally executed by the CPU 106.

Long streams of instruction data may require the instruction cache memory 110 to be refilled periodically from the main memory 104. The ICC control logic 114 may indicate that additional instructions are requested by presenting a signal (e.g., FETCH) at an output 124. An input 126 of the bus interface unit 112 receives the signal FETCH.

The bus interface unit 112 is generally responsible for copying instruction data from the main memory 104 to the instruction cache memory 110 responsive to the signal FETCH. The bus interface unit 112 generally copies several instructions at a time each time the bus interface unit 112 copies or fetches instruction data from the main memory 104. The smallest unit of information that can be fetched from the main memory 104 to the instruction cache memory 110 is called a cache line. Each cache line generally, although not necessarily, comprises four or eight instructions. Larger and smaller cache lines may be implemented to meet the design criteria of a particular application.

An output 128 of the bus interface unit 112 may present the instructions to the instruction cache memory 110 in a data signal (e.g., I$_DATAIN). Another output 129 of the bus interface unit 112 may present addresses for the instructions in an address signal (e.g., I$_ADDR). Yet another output 130 of the bus interface unit 112 may present a valid signal (e.g., I$_VALID) to the ICC control logic 114. An input 131 of the ICC control logic 114 may receive the signal I$_VALID. An output 132 of the ICC control logic 114 may present a write signal (e.g., I$_WRITE) responsive to the signal I$_VALID. The instruction cache memory 110 receives the signal I$_DATAIN, the signal I$_ADDR and the signal I$_WRITE at inputs 134, 136 and 138 respectively.

Long periods are usually required to fetch the cache line from the main memory 104 to the instruction cache memory 110. The actual time required to move the cache line depends upon access delays and the speed of the main memory 104. Once the bus interface unit 112 has started a cache line fetch operation, the bus interface unit 112 will continue the cache line fetch operation until the entire cache line has been written into the instruction cache memory 110. The bus interface unit 112 may be configured to momentarily pause the cache line fetch operation. However, the bus interface unit 112 generally cannot terminate the cache line fetch operation prior to completion.

An output 140 of the ICC control logic 114 may be provided to present a stall signal (e.g., CPU_STALL) to the CPU 106. An input 142 of the CPU 106 may receive the signal CPU_STALL. Traditionally, the ICC control logic 114 could assert the signal CPU_STALL if a branching instruction was detected during an instruction cache line fetch operation. In a preferred embodiment of the present invention, the ICC control logic 114 does not assert the signal CPU_STALL if a branching instruction is detected during an instruction cache line fetch operation.

An input 144 may be provided for the ICC control logic 114 to receive the signal CPU_INSTR_ADDR. The ICC control logic 114 is generally configured to detect a branching instruction by monitoring the signal CPU_INSTR_ADDR. An output 146 of the ICC control logic 114 may be provided to present a pause signal (e.g., READY/PAUSE) in the event that a branching instruction is detected. An input 148 of the bus interface unit 112 may receive the signal READY/PAUSE. When the ICC control logic 114 presents the signal READY/PAUSE in a pause state, then the bus interface unit 112 extends the signal I$_VALID an extra cycle thus the ICC control logic 114 knows to de-assert the signal I$_WRITE.

An output 150 of the CPU 106 may present an instruction kill signal (e.g., CPU_KILL) to the ICC control logic 114. An input 152 of the ICC control logic 114 may receive the signal CPU_KILL. The signal CPU_KILL may be used to indicate that a prediction by the CPU 106 to follow a branch was incorrect.

Figure 2:
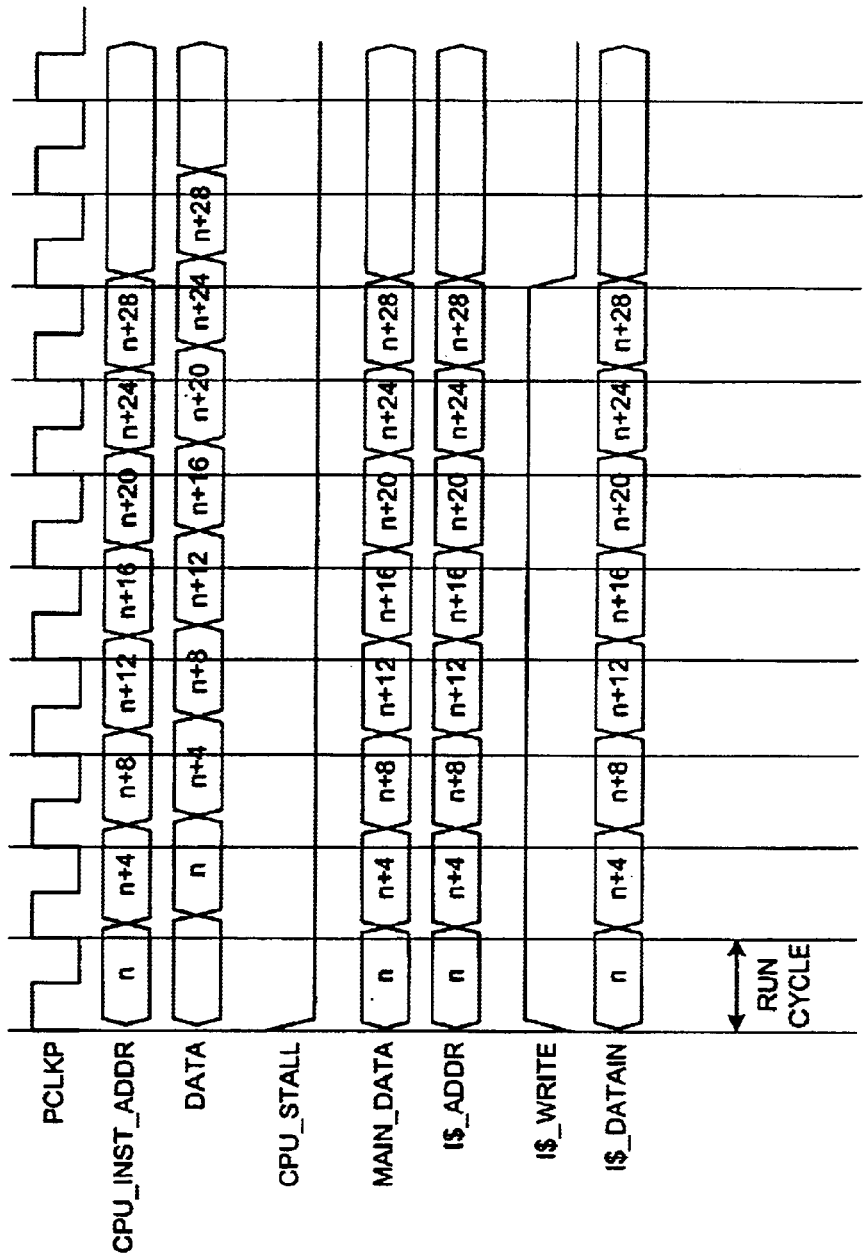
FIG. 2 is a timing diagram of a sequential instruction stream without a branch instruction.

Referring to FIG. 2, a timing diagram illustrating an instruction cache line fetch operation and execution operation is shown. In the example shown in FIG. 2, all of the instruction addresses in the signal CPU_INSTR_ADDR are sequential. An example instruction cache line with a predetermined size of eight instruction data items is also shown. However, other instruction cache line sizes may be implemented accordingly to meet the design criteria of a particular implementation. A clock signal (e.g., PCLKP) generally illustrates a pipeline clock for the circuit 100. Each cycle of the signal PCLKP with the signal CPU_STALL de-asserted in a non-stall state (e.g., a digital LOW) is often called one run cycle.

The ICC control logic 114 generally presents the signal FETCH when additional instructions are required from the main memory 104. The bus interface unit 112 may respond to the signal FETCH by reading a predetermined number of instruction data items from the main memory 104.

The bus interface unit 112 may present the instruction data sequentially (e.g., n,n+4,n+8, . . . , n+28) as the signal I$_DATAIN, the signal I$_ADDR, and the signal I$_VALID. The signal I$_DATAIN is generally written until all of the instruction cache line has been stored in the instruction cache memory 110. In the current example, the instruction data is stored in the main memory 104 as four-byte (32-bit) words. The identifier "n" is therefore incremented by units of four during each run cycle. However, other increments may be used to accommodate other instruction data size and/or multiple instruction data items per unit word of memory.

The program counter 108 generally presents the signal CPU_INSTR_ADDR to the instruction cache memory 110 to identify a requested instruction data item. As shown in FIG. 2, the signal DATA is generally presented to the CPU 106 one run cycle after the signal CPU_signal CPU_INSTR_ADDR is presented to the instruction cache memory 110. The process may be repeated every run cycle until all of the instruction data items have been presented to the CPU 106 in sequence.

The ICC control logic 114 may be configured to present the signal CPU_STALL de-asserted in the non-stall state during the instruction cache line fetch. This is possible because the CPU 106 does not request an instruction data item out of the normal sequence found within the instruction cache line. As a result, the instruction cache memory 110 may present the signal DATA to the CPU 106 uninterrupted while the signal I$_DATAIN is being received from the bus interface unit 112. The signal CPU_STALL is received by the CPU 106 at an input 142.

Referring to FIG. 3, an example of an instruction cache line fetch operation and an execution operation encountering a branch instruction without implementing the present invention is shown. In this example, the bus interface unit 112 fetches a predetermined number of instruction data items from the main memory 104 and writes the instruction data items into the instruction cache memory 110. The presentation of the signal DATA to the CPU 106, however, may be altered by the presence of the branch instruction, as indicated by a branch target address 300 (e.g., BT) in the signal CPU_INSTR_ADDR.

The CPU 106 may predict that the branch will be taken. In other words, a branch prediction of taken occurs. The branch target address 300 is generally identifiable as being non-sequential with respect to a stream of preceding instruction addresses. If not implementing the present invention, then the ICC control logic 114 will usually present the signal CPU_STALL asserted in a stall state (e.g., a digital HIGH) if the branch target address 300 is detected while an instruction cache line fetch operation is in progress. The ICC control logic 114 will continue to assert the signal CPU_STALL as long as the instruction cache line fetch operation is in progress.

The length of the stall is dependent upon the position of the branch target address 300 within the instruction cache line. The example shown in FIG. 3 illustrates the branch target address 300 position approximately midway through the instruction cache line of n to n+28. The signal CPU_STALL is asserted in the stall state for basically the second half of the instruction cache line fetch operation (e.g, portion 302). If the branch target address were to be presented earlier in the instruction cache line fetch operation, then the CPU 106 would be stalled for more stall cycles until the instruction cache line fetch operation has completed. If the branch target address were to be presented later in the instruction cache line fetch operation, then the CPU 106 would be stalled for a shorter number of the stall cycles.

The ICC control logic 114 may de-assert (e.g., a digital LOW) the signal CPU_STALL once the ongoing instruction cache line fetch operation has completed. Once the instruction cache line fetch operation has completed, a new instruction cache line fetch operation will be initiated, if necessary. The new instruction cache line fetch operation may fetch the instruction data item stored in the main memory 104 and associated with the branch target address 300. Fetching any instruction data item from the main memory 104 generally requires many run cycles to complete. For example, the CPU 106 may wait an average of ten run cycles until the instruction address associated with the branch target address 300 is available to the CPU 106.

In situations where the branch prediction to take the branch is incorrect, the CPU stall cycles are unnecessary. As can be seen in FIG. 3, although the CPU 106 is stalled, the bus interface unit 112 is still busy copying the signal I$_DATAIN into the instruction cache memory 110. The next instruction data item that the CPU 106 really requires is instruction data item n+12, as indicated by reference number 304. Instruction data item n+12 (reference number 304) is available in the instruction cache memory 110 after the fourth cycle.

Figure 4:
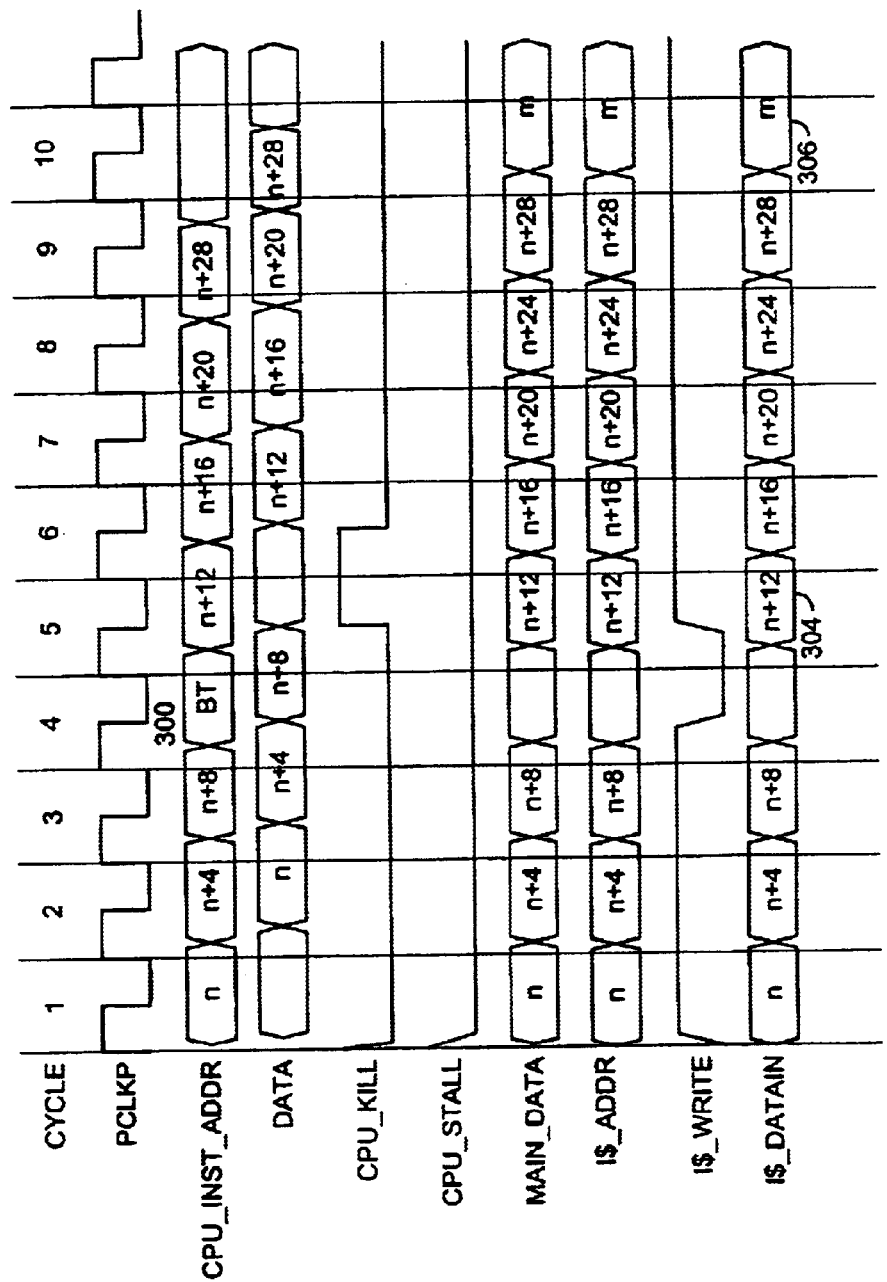
FIG. 4 is a timing diagram of an instruction stream containing a branch instruction without requiring a pipeline stall.

Referring to FIG. 4, an example of a branch mispredict sequence is illustrated in accordance with a preferred embodiment of the present invention. The branch target address 300 of a branch instruction is detected in the fourth cycle of the cache line in this example. The non-sequential nature of the branch target address 300 may be detected by the instruction cache memory 110 as before. However, the ICC control logic 114 will not assert the signal CPU_STALL in the stall state.

The ICC control logic 114 has a general capability to detect the branch instruction from the signal CPU_INSTR_ADDR as received at the input 144. In particular, the ICC control logic 114 may detect the non-sequential branch target address 300 in a stream of sequential instruction addresses in the signal CPU_INSTR_ADDR. The ICC control logic 114 may command a pause in the instruction cache line fetch operation upon detection of the branch target address 300. The ICC control logic 114 will present the signal READY/PAUSE in a pause state in response to detecting the branch target address. The bus interface unit 112 generally responds to the pause state of the signal READY/PAUSE by suspending writes to the instruction cache memory 110. In particular, the bus interface unit 112 may extend the signal I$_VALID an extra cycle. In turn, the ICC control logic 114 may de-assert the signal I$_WRITE to a disabled state (e.g., a digital LOW). When the signal I$_WRITE is in the disabled state, caching of the instruction data items may be disabled by disallowing writes to the instruction cache memory 110.

The CPU 106 may use one or more run cycles to determine if the branch prediction to take the branch was correct or not. The CPU 106 may make the determination within a predetermined number of run cycles. In a preferred embodiment, the CPU 106 makes the determination within one run cycle after presenting the branch target address 300 in the signal CPU_INSTR_ADDR.

The CPU 106 may be configured to present the signal CPU_KILL in an active state (e.g., a digital HIGH) in situations where the CPU 106 has determined that taking the branch was a branch misprediction. The CPU 106 generally asserts the signal CPU_KILL in the active state for one run cycle. The ICC control logic 114 may respond to the signal CPU_KILL in the active state by asserting a ready state for the signal READY/PAUSE. In other words, the ICC control logic 114 may present a ready signal to the bus interface unit 112. The bus interface unit 112 generally responds to the ready state of the signal PAUSE/READY by resuming the instruction cache line fetch operation. At this point, the CPU 106 is free to continue with instruction data item n+12 (reference number 304) in the next run cycle. Upon completion of the current instruction cache line fetch, another instruction cache line fetch may be initiated at the next sequential address, for example at m=n+32.

In a preferred embodiment of the present invention, a branch misprediction penalty may be limited to one run cycle. The present invention may provide a branch misprediction run cycle penalty that is independent of the position of the branch target address 300 within the instruction cache line fetch operation. As a result, the instruction cache line may potentially be made larger without increasing the branch misprediction run cycle penalty.

The present invention introduces a minor delay in situations where the branch prediction to take the branch is correct. If the branch prediction is correct, then the CPU 106 does not present the signal CPU_KILL asserted in the active state. After the predetermined number of run cycles (e.g., at most one run cycle in a preferred embodiment), the ICC control logic 114 asserts the ready state for the signal READY/PAUSE to the bus interface unit 112. The bus interface unit 112 may respond to the ready state by completing the instruction cache line fetch operation. A new instruction cache line fetch may then be initiated, if necessary, to retrieve the instruction data item associated with the branch target address 300. For example, the branch target address may be associated with a subsequent instruction "m", indicated by reference number 306, copied from the main memory 104.

The present invention may be applied to situations where a unit length of the main memory 104 is an integer multiple of the instruction data items. For example, the CPU 106 may be executing 16-bit instructions while the main memory 104 is storing two 16-bit instructions data items in one 32-bit word. In this case, the program counter 108 updates the signal CPU_INSTR_ADDR every other run cycle since two instruction data items are passed at once. Likewise, the instruction cache memory 110 updates the signal DATA every other run cycle since two instruction data items are passed at once. Consequently, the ICC control logic 114 will only be able to detect a non-sequential branch target address 300 in the signal CPU_INSTR_ADDR during every other run cycle.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation.

The various signals of the present invention are generally shown on individual inputs and outputs. In other embodiments, some or all of the various signals may be multiplexed through one or more inputs and/or outputs as desired or required.

The functions shown the graphs of FIGS. 2 and 4 may be implemented using a conventional general purpose processor programmed according to the teaching of the present invention, as will be apparent to those skilled in the relevant arts. Appropriate software coding can be readily prepared by skilled programmers based on the teachings of the present disclosure, as will also be apparent to those skilled in the relevant arts.

The present invention thus includes a computer product that may be an information storage medium including instructions that can be used to program a computer to perform operations in accordance with the present invention. The information storage medium may include, but is not limited to, any type of disk including floppy disk, optical disk, CD-ROM, and magneto-optical disks, ROMs, RAMs, EPROMs, Flash memory, magnetic or optical cards, or any type of media suitable for storing electronic instructions.

The present invention may also be implemented by the preparation of ASICs, FPGAs, or by interconnecting an appropriate network of conventional components circuits that will be readily apparent to those skilled in the arts.

While the invention has been particularly shown and described with reference to the preferred embodiments thereof, it will be understood by those skilled in the art that various changes in form and details may be made without departing from the spirit and scope of the invention.

What is claimed is:

1. A method for branching, comprising the steps of:

(A) evaluating a branch prediction for a branch instruction;

(B) pausing an instruction cache line fetch in response to said branch instruction; and (C) resuming said instruction cache line fetch from where paused in response to evaluating said branch prediction as incorrect to recover from said branch prediction.

2. The method of claim 1, further comprising the steps of:

resuming said instruction cache line fetch from where paused a predetermined number of cycles after said branch instruction in response to evaluating said branch prediction as correct to continue said branch prediction; and initiating another instruction cache line fetch in response to completing said instruction cache line fetch to obtain a subsequent instruction for said branch instruction.

3. The method of claim 1, further comprising the step of:

resuming said instruction cache line fetch within at most one cycle from pausing said instruction cache line fetch.

4. The method of claim 1, further comprising the step of:

detecting a non-sequential branch target address in a stream of sequential instruction addresses prior to pausing said instruction cache line fetch to detect said branch instruction.

5. The method of claim 1, wherein said step (B) further comprises the sub-steps of:

asserting a pause signal in response to said instruction branch to suspend cache writing of at least one instruction line; and de-asserting a write signal to disable said instruction cache line fetch in response to said asserting of said pause signal.

6. The method according to claim 1, further comprising the step of:

asserting a kill signal to indicate that said branch prediction is incorrect.

7. The method according to claim 6, wherein step (C) is in further response to said asserting of said kill signal.

8. A circuit comprising:

a central processor unit configured to (i) evaluate a branch prediction for a branch instruction, and (ii) present a kill signal in an active state in response to evaluating said branch prediction as incorrect;

an instruction cache memory configured to store an instruction cache line for use by said central processor unit; and a control logic configured to (i) pause an instruction cache line fetch responsive to said branch instruction and (ii) resume said instruction cache line fetch from where paused responsive to said kill signal in said active state.

9. The circuit of claim 8, wherein said control logic is further configured to resume said instruction cache line fetch from where paused a predetermined number of cycles after detecting said branch instruction and initiate another instruction cache line fetch responsive to said branch instruction after said instruction cache line fetch has completed.

10. The circuit of claim 8, wherein said control logic is further configured to pause said instruction cache line fetch for at most one cycle.

11. The circuit of claim 8, wherein said control logic is further configured to detect said branch instruction as a non-sequential branch target address in a stream of sequential instruction addresses.

12. The circuit of claim 8, further comprising:

a bus interface unit configured to copy said instruction cache line from a memory to said instruction cache memory, wherein said control logic is further configured to (i) assert a pause signal to said bus interface unit in response to detecting said branch instruction to suspend copying said instruction cache line and (ii) de-assert a write signal to said instruction cache memory to disable writing of said instruction cache line.

13. The circuit of claim 12, wherein said control logic is further configured to (i) detect said branch instruction as a non-sequential branch target address in a stream of sequential instruction addresses, (ii) resume said instruction cache line fetch one cycle after detecting said branch instruction and (iii) initiate another instruction cache line fetch responsive to said non-sequential branch target address after said instruction cache line fetch has completed.

14. The circuit according to claim 8, further comprising:

a bus interface unit configured copy said instruction cache line from a memory to said instruction cache memory in response to an assertion of a fetch signal by said control logic.

15. The circuit according to claim 14, wherein (A) said bus interface unit is further configured to (i) assert a valid signal to said control logic while presenting said instruction cache line to said instruction cache memory and (ii) extend said assertion of said valid signal for one extra run cycle in response to said control logic asserting a pause signal and (B) said control logic is further configured to (i) assert a write signal to said instruction cache memory to enable writing of said instruction cache line, (ii) assert said pause signal in response to detecting said branch instruction and (iii) de-assert said write signal in response to said valid signal being extended one extra run cycle to inhibit writing.

16. A circuit comprising:

means for evaluating a branch prediction for a branch instruction;

means for pausing an instruction cache line fetch in response to said branch instruction; and means for resuming said instruction cache line fetch from where paused in response to evaluating said branch prediction as incorrect to recover from said branch prediction.

17. The circuit of claim 16, further comprising:

means for resuming said instruction cache line fetch from where paused a predetermined number of cycles after said branch instruction in response to evaluating said branch prediction as correct to continue said branch prediction; and means for initiating another instruction cache line fetch in response to completing said instruction cache line fetch to obtain a subsequent instruction for said branch instruction.

18. The circuit of claim 16, further comprising:

means for resuming said instruction cache line fetch within at most one cycle from pausing said instruction cache line fetch.

19. The circuit of claim 16, further comprising:

means for detecting a non-sequential branch target address in a stream of sequential instruction addresses prior to pausing said instruction cache line fetch to detect said branch instruction.

20. The circuit of claim 16, wherein said means for pausing said instruction cache line fetch comprises:

means for asserting a pause signal in response to said instruction branch to suspend cache writing of at least one instruction line; and means for de-asserting a write signal to disable said instruction cache line fetch in response to asserting said pause signal.

* * * * *